US012737470B2

(12) United States Patent
Gustavsson et al.

(10) Patent No.: US 12,737,470 B2
(45) Date of Patent: Sep. 15, 2026

(54) FULL DISK ENCRYPTION ANTI-MALWARE SCAN

(71) Applicant: Check Point Software Technologies, Ltd., Tel Aviv (IL)

(72) Inventors: Lars Fredrik Gustavsson, Stockholm (SE); Doron Zuckerman, Tel Aviv (IL); Yuri Staloverov, Kfar Saba (IL)

(73) Assignee: Check Point Software Technologies, Ltd., Tel Aviv (IL)

( * ) Notice: Subject to any disclaimer, the term of this patent is extended or adjusted under 35 U.S.C. 154(b) by 218 days.

(21) Appl. No.: 18/761,740

(22) Filed: Jul. 2, 2024

(65) Prior Publication Data

US 2026/0010632 A1 Jan. 8, 2026

(51) Int. Cl.

| | |
|---|---|
| ***G06F 21/57*** | (2013.01) |
| ***G06F 21/33*** | (2013.01) |
| ***G06F 21/56*** | (2013.01) |
| ***H04L 12/46*** | (2006.01) |

(52) U.S. Cl.

CPC ............ *G06F 21/575* (2013.01); *G06F 21/33* (2013.01); *G06F 21/56* (2013.01); *H04L 12/4641* (2013.01)

(58) Field of Classification Search

CPC ........ G06F 21/575; G06F 21/33; G06F 21/56; H04L 12/4641

See application file for complete search history.

(56) References Cited

U.S. PATENT DOCUMENTS

| | | | | |
|---|---|---|---|---|
| 11,763,004 | B1 * | 9/2023 | Davis | G06F 21/566 726/24 |
| 2004/0236960 | A1 * | 11/2004 | Zimmer | G06F 21/561 713/188 |
| 2005/0216759 | A1 * | 9/2005 | Rothman | G06F 21/56 726/22 |
| 2010/0153696 | A1 * | 6/2010 | Beachem | G06F 21/575 717/174 |
| 2011/0093953 | A1 * | 4/2011 | Kishore | G06F 21/629 726/24 |
| 2011/0185424 | A1 * | 7/2011 | Sallam | H04L 63/1433 726/23 |

(Continued)

OTHER PUBLICATIONS

R. Elnaggar, K. Basu, K. Chakrabarty and R. Karri, "Runtime Malware Detection Using Embedded Trace Buffers," in IEEE Transactions on Computer-Aided Design of Integrated Circuits and Systems, vol. 41, No. 1, pp. 35-48, Jan. 2022 (Year: 2022).*

(Continued)

*Primary Examiner* — Jung W Kim
*Assistant Examiner* — Sameera Wickramasuriya
(74) *Attorney, Agent, or Firm* — Renner, Otto, Boisselle & Sklar LLP

(57) ABSTRACT

A computer device, system, and method are provided for leveraging the Full Disk Encryption (FDE) pre-boot environment to conduct anti-malware scans during computer startup, enhancing security by identifying and mitigating malware threats before the main operating system is loaded. To do so, a processor circuitry of the computer device identifies indicators for objects stored in a targeted memory to be scanned. The processor circuitry sends the indicators to a reputation service via a communication interface and receives feedback concerning whether the objects are malicious, suspicious, or benign.

18 Claims, 3 Drawing Sheets

(56) References Cited

U.S. PATENT DOCUMENTS

| | | | | |
|---|---|---|---|---|
| 2011/0247017 | A1* | 10/2011 | Hopkins | G06F 16/27 719/328 |
| 2011/0271347 | A1* | 11/2011 | Zimmer | G06F 21/562 726/24 |
| 2012/0089742 | A1* | 4/2012 | Jagannatharao | H04L 63/0876 709/229 |
| 2014/0006760 | A1* | 1/2014 | Nemiroff | G06F 21/554 713/180 |
| 2014/0156981 | A1* | 6/2014 | Hamid | G06F 11/1004 713/2 |
| 2015/0019850 | A1* | 1/2015 | Rivera | G06F 21/572 713/1 |
| 2016/0112444 | A1* | 4/2016 | Palumbo | G06F 21/567 726/23 |
| 2016/0328564 | A1* | 11/2016 | Vidyadhara | G06F 21/575 |
| 2018/0159871 | A1* | 6/2018 | Komashinskiy | H04L 63/1416 |
| 2018/0288077 | A1* | 10/2018 | Siddiqui | H04L 63/1416 |
| 2019/0007455 | A1* | 1/2019 | Sheng | H04L 63/1416 |
| 2020/0099719 | A1* | 3/2020 | Rahkonen | H04L 67/568 |
| 2020/0272734 | A1* | 8/2020 | Tora | G06F 21/565 |
| 2021/0382782 | A1* | 12/2021 | Roy | G06F 11/3423 |
| 2024/0070274 | A1* | 2/2024 | Schooley | G06F 21/56 |
| 2025/0328621 | A1* | 10/2025 | Singh | G06F 21/554 |

OTHER PUBLICATIONS

Schmidt, Matthias, et al. "Malware detection and kernel rootkit prevention in cloud computing environments." 2011 19th International Euromicro Conference on Parallel, Distributed and Network-Based Processing. IEEE, 2011. (Year: 2011).*

* cited by examiner

FULL DISK ENCRYPTION ANTI-MALWARE SCAN

TECHNICAL FIELD

The present disclosure relates generally to security software and, more specifically, to performing a pre-boot malware scan.

BACKGROUND

The pre-boot environment is initiated by a computer system before the main operating system is loaded. This environment can offer various security services, including user authentication and the acquisition of disk encryption/decryption keys necessary for encrypting and decrypting disk partitions, including those containing the main operating system. Once these security measures are completed, the pre-boot environment loads the main operating system and transfers control to the loaded operating system.

Full Disk Encryption (FDE) provides a high level of data security by integrating boot protection with strong disk encryption, ensuring that only authorized users can access data stored on desktop, laptop and mobile computers. FDE comprises two primary components: disk encryption and pre-boot protection.

Disk encryption ensures that all volumes of the hard drive (including hidden volumes) are automatically fully encrypted, making the encrypted disk inaccessible to unauthorized individuals. This process encompasses system files, temporary files, and even deleted files, all encrypted without causing user downtime, as encryption occurs in the background without noticeable performance degradation.

Pre-boot protection mandates user authentication before the computer boots, preventing unauthorized access to the operating system. This security measure thwarts the use of authentication bypass tools at the operating system level or alternative boot media to circumvent boot protection.

SUMMARY

While in the Full Disk Encryption (FDE) pre-boot environment, the computer does not have access to online reputation services for performing a malware scan. This is in part due to the FDE pre-boot environment not having access to the network configuration of the operating system.

The present disclosure provides a system, computer device, and method for leveraging the Full Disk Encryption (FDE) pre-boot environment to conduct anti-malware scans during computer startup, enhancing security by identifying and mitigating malware threats before the main operating system is loaded.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
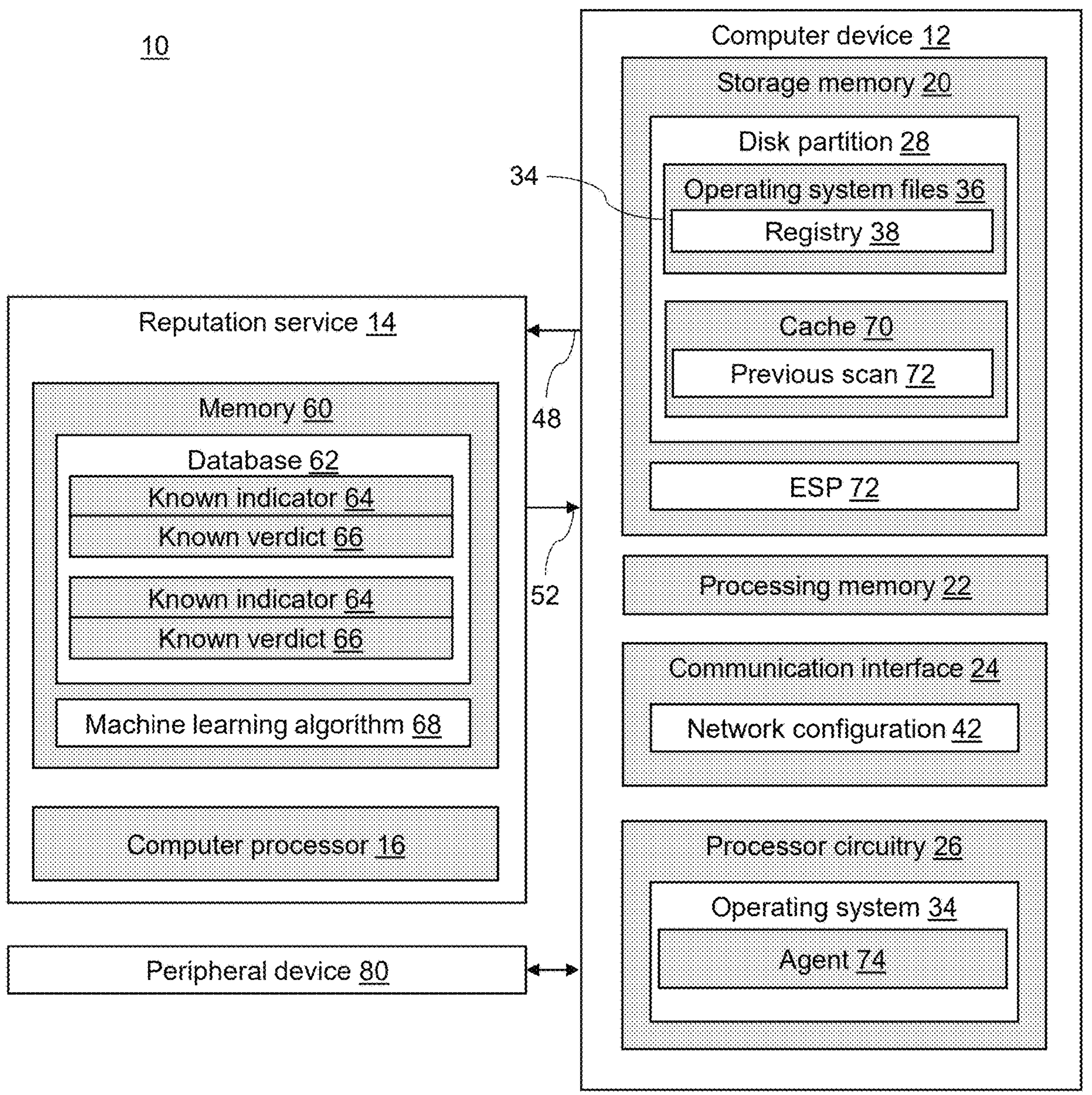
FIG. 1 is an exemplary diagram of a system for leveraging a Full Disk Encryption (FDE) pre-boot environment to conduct anti-malware scans during startup.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a system, computer device, and method for leveraging the Full Disk Encryption (FDE) pre-boot environment to conduct anti-malware scans during computer startup, enhancing security by identifying and mitigating malware threats before the main operating system is loaded. To do so, processor circuitry of the computer device identifies indicators for objects stored in a targeted memory to be scanned. The processor circuitry sends the indicators to a reputation service via a communication interface and receives feedback concerning whether the objects are malicious, suspicious, or benign.

Turning to FIG. 1, a system 10 is shown for leveraging the Full Disk Encryption (FDE) pre-boot environment to conduct anti-malware scans during computer startup. The system 10 utilizes the combined capabilities of a computer device 12 and a reputation service 14.

The reputation service 14 comprises computer hardware including a computer processor 16. As is described in further detail below, the reputation service 14 receives indicators for a scanned object from the computer device 12. The reputation service provides a verdict indicating whether the scanned object is malicious, suspicious, or benign based on the received indicators.

The computer device 12 includes storage memory 20, processing memory 22, a communication interface 24, and processor circuitry 26. The processing memory 22 is a temporary non-transitory computer readable medium (also referred to as volatile memory). For example, the processing memory 22 may comprise volatile memory such as RAM (Random Access Memory) and may be used to temporarily store data and instructions that the processor circuitry 26 uses while executing tasks. Conversely, the storage memory 20 is a non-transitory computer readable medium including disk partitions 28 including an EFI (Extensible Firmware Interface) system partition (ESP) 30 and at least one other disk partition storing an operating system 34. The operating system 34 includes operating system files 36 having a registry 38.

The ESP is a disk partition stored in the memory of computer devices that have the Unified Extensible Firmware Interface (UEFI). When a computer is booted, UEFI firmware loads files stored on the ESP to start operating systems and various utilities. The ESP includes the boot loaders, boot managers, or kernel images of installed operating systems (which may be contained in other partitions), device driver files for hardware devices present in a computer and used by the firmware at boot time, system utility programs that are intended to be run before an operating system is booted, and data files (e.g., error logs). Traditional anti-virus (also referred to as anti-malware) software does not scan the ESP or only scans the ESP by mounting the partition from within the operating system.

Figure 2:
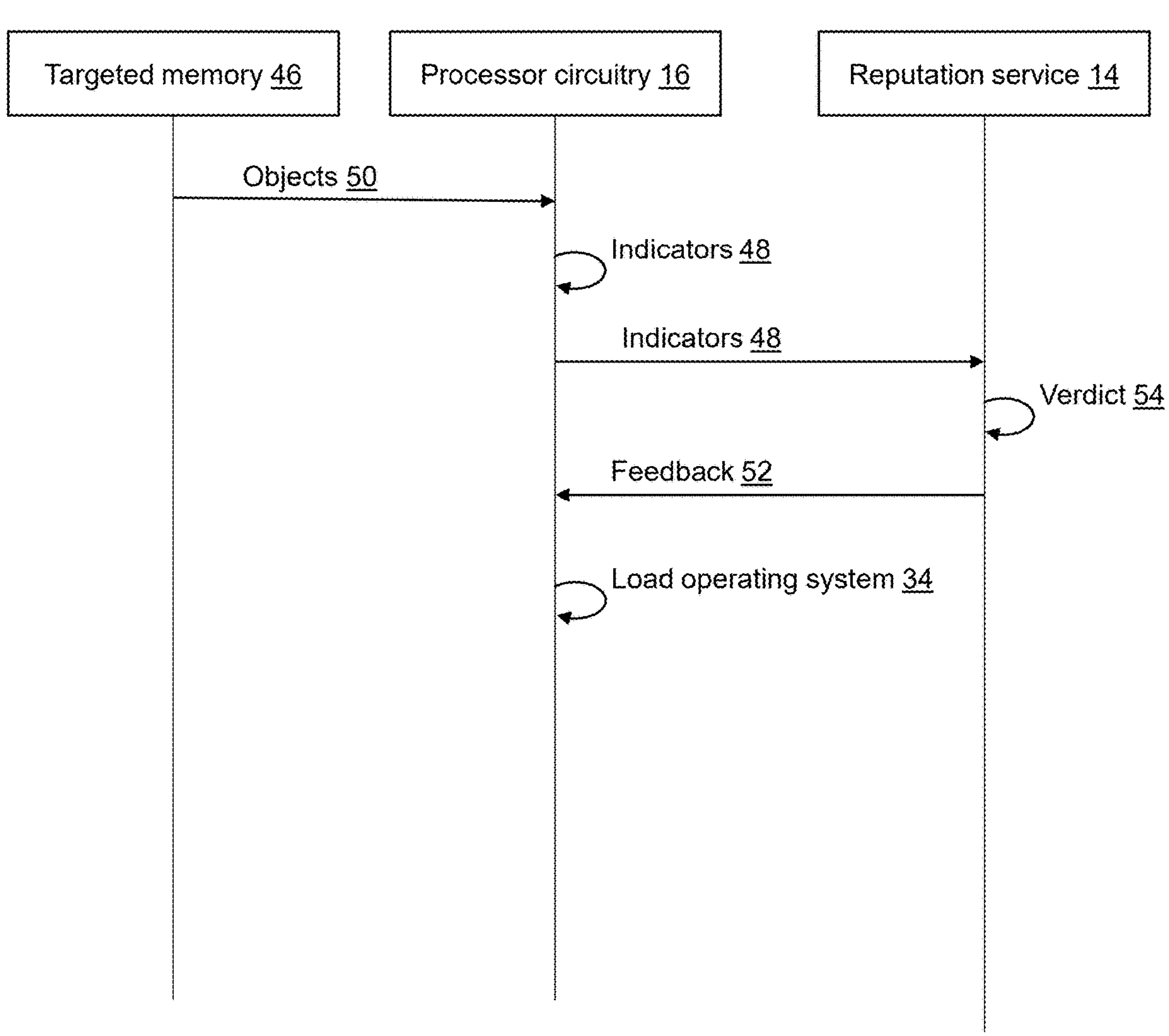
FIG. 2 is a ladder diagram showing movement of information between a targeted memory and processor circuitry of a computer device, and a reputation service of the system.

With exemplary reference to FIG. 2, the processor circuitry 26 loads the stored operating system 34 during startup. However, before loading the operating system 34, the processor circuitry 26 scans a targeted memory 46. The processor circuitry 26 scans the targeted memory 46 by identifying indicators 48 for objects 50 stored in the targeted memory 46. The processor circuitry 26 sends the identified indicators 48 to the reputation service 14 and receives feedback 52 from the reputation service via the communication interface 24.

The targeted memory 46 includes at least one of the ESP 30, the disk partition(s) 28, the registry of the operating system files 38, or the processing memory 22. By scanning one or more of these locations, malware may be identified in important objects that could have caused issues if the operating system had been loading before scanning for malware. For example, the ESP 30 may contain boot-related programs and configurations, while the disk partition(s) 28 store the main operating system and user data. The registry of the operating system files 38 may include configuration settings, and the processing memory 22 (e.g., RAM) may hold active data and processes.

The objects 50, stored in the targeted memory, may include various types of data such as files, directories, registry keys, and registry values. These objects 50 can be identified by different indicators 48, including file hashes, file names, and directory names. For instance, a file hash uniquely identifies a file based on its content, a file name provides a human-readable identifier, and a directory name indicates the location of the object within the file system. Each of the identified indicators 48 is associated with at least one of the stored objects 50, enabling identification of malicious, benign, and suspicious objects.

The feedback 52 received from the reputation service 14 includes at least one verdict 54. Each of the verdicts 54 are associated with at least one of the indicators 48 that were sent to the reputation service 14. For example, the reputation service 14 may analyze the received indicators 48 and provide a corresponding verdict 54 for each of the received indicators 48. Each of the verdicts 54 identifies the associated stored objects 50 (i.e., the object 50 associated with the indicator 48 used by the reputation service 14 in making the verdict 54) as malicious, suspicious, or benign. For example, if a file hash is sent as an indicator and the reputation service 14 recognizes it as associated with known malware, the verdict 54 will classify the file as malicious.

The processor circuitry 26 loads the stored operating system 34 based on the received feedback 52. This process may involve using the feedback 52 to determine the appropriate actions to ensure the operating system's security. For example, the processor circuitry 26 may quarantine any of the stored objects 50 identified as malicious before loading the operating system 34. Quarantining may include isolating objects identified as malicious (i.e., malicious objects) to prevent such objects from causing harm or spreading infection within the computer device 12. In this way, the operating system 34 may be loaded in a secure state, free from known threats.

Alternatively or additionally, the processor circuitry 26 may delay loading of the operating system 34 and issue a notification to the user. This notification can provide details about the identified threats and the actions taken, enabling the user to make informed decisions about how to proceed. For example, if a critical system file is flagged as suspicious, the user might need to decide whether to allow or block its execution. The processor circuitry 26 may request user input before loading the operating system 34 when receiving a verdict identifying an object as malicious or suspicious. This request can appear as a prompt or alert on the user interface, asking for confirmation or additional instructions. By involving the user in the decision-making process, the system can ensure that appropriate measures are taken based on the user's preferences and the specific context of the identified threat.

The reputation service 14 may be any suitable device for determining a verdict 54 based on one or more indicators 48. For example, the reputation service 14 may be a local database, a remote database, or a remote service. In one embodiment, the computer processor 16 of the reputation service 14 receives the indicators 48 sent by the computer device 12 and analyzes the indicators 48 to determine the feedback 52. This analysis may involve comparing the received indicators 48 with known data to identify potential threats.

The computer device 12 may determine the feedback 52 for the received indicators 48 using any suitable processing/analysis. For example, the reputation service may include memory storage 60 comprising a non-transitory computer readable medium and storing a database 62 associating known indicators 64 with known verdicts 66 (such that each of the stored known indicators 64 is associated with a known verdict 66). The computer processor 16 may compare each of the received indicators 48 to the database 62 and apply the associated known verdict 66 to a received indicator 48 when the received indicator 48 matches one of the stored known indicators 64. This comparison may allow the reputation service 14 to quickly and accurately identify whether an indicator 48 corresponds to a known malware or benign object. For instance, if an indicator 48 (such as a file hash) matches a known malicious hash in the database 62, the associated verdict 66 (e.g., "malicious") may be applied, triggering appropriate security measures.

Alternatively or additionally, the reputation service 14 may store in the memory storage 60 a machine learning algorithm 68 trained to generate a verdict 54 based on an input indicator 48. Machine learning algorithms can enhance the capability of the reputation service 14 by allowing it to recognize and classify new or unknown threats based on patterns learned from historical data. The computer processor 16 may apply the machine learning algorithm 68 to each of the received indicators 64, such that the machine learning algorithm outputs the generated verdict 54 for each of the received indicators 64. The computer processor 16 may apply the generated verdict 54 to each of the received indicators 64.

In one embodiment, when receiving an indicator, the reputation service 14 first checks a database 62 for a matching indicator 48. When the indicator is found in the database 62, the reputation service 14 uses the verdict 54 stored in association with the matching indicator 48. When the indicator is not found in the database 62, the reputation service 14 may apply the machine learning algorithm 68 to the indicator 48 to generate a verdict 54.

To save time and resources, the processor circuitry 26 may limit scanning (i.e., scanning for malware) to a limited set of objects 50 stored in the targeted memory 46 (such as those objects that the operating system relies on for its integrity). This approach may focus the scanning efforts on the most critical areas, reducing the overall scanning duration and computational load. For example, the objects 50 may be limited, such that the scanning of the targeted memory 46 occurs within a limited time duration. This time-efficient scanning can be particularly beneficial in scenarios where rapid system boot-up is desired.

The processor circuitry 26 may also save time and resources during scanning by using a cache 70 stored in the storage memory 20. The cache 70 may store previous scans 72 of the targeted memory 46, creating a repository of historical scan data. Each of the stored previous scans 72 may include at least one previous indicator 48 associated with at least one previous verdict 54 received from the reputation service 14. This cached information enables quicker decision-making during subsequent scans. Each of the previous verdicts 54 may identify the associated previous indicator 48 as malicious, suspicious, or benign. For instance, if an indicator has previously been identified as benign, this information can expedite the current scan process by bypassing re-evaluation.

The time relevance of the cache 70 may be maintained by removing older previous scans from the cache. For example, each of the previous scans may include a time stamp. The processor circuitry may remove from the cache previous scans having a time stamp older than a threshold time duration (e.g., older than 30 days).

When using the cache 70 and before sending the identified indicators 48 to the reputation service 14, the processor circuitry 26 may search in the cache 70 for each of the identified indicators 48. This preliminary check can significantly reduce the number of requests sent to the reputation service 14. When the matching indicator 48 is found in the cache 70, the processor circuitry 26 may apply to the identified indicator 48 the verdict associated with the matching identified indicator 48 in the cache. This reuse of previous verdicts makes use of historical data for efficient threat assessment. When the matching indicator 48 is not found in the cache 70, the processor circuitry 26 may send the identified indicator 48 to the reputation service 14. This ensures that new or modified indicators are still evaluated for potential threats. In this way, the cache 70 may be used to reduce the number of indicators 48 sent to the reputation service 14 by reducing redundant analysis.

The scan for malware may be initiated automatically. For example, the scan may begin whenever the processor circuitry boots up (i.e., whenever the processor circuitry is attempting to load the operating system and enters the FDE pre-boot environment). The scanning may also be limited such that the targeted memory is not scanned more than once per day. The scan may also be manually initiated by a user (e.g., through a pre-boot user interface) or an administrator locally or remotely.

The communication interface 24 communicates with the reputation service 14 using a network configuration 42. This network configuration 42 can include various types of connections, such as wired or wireless networks, enabling the computer device 12 to interact with the reputation service 14. For example, the network configuration 42 may include at least one of network credentials, a list of one or more trusted certificate authorities (CAs), or connection information for a virtual local area network (VLAN) having access to limited external services including the reputation service. Network credentials may include authentication information such as usernames, passwords, or tokens required to establish a secure connection. Trusted certificate authorities (CAs) ensure that the communication is encrypted and secure, preventing unauthorized access. The VLAN configuration can segregate network traffic to provide enhanced security and performance by limiting access to specific external services, such as the reputation service 14. For example, such a dedicated network, could be used to allow the pre-boot environment to connect (directly or through a proxy) to needed reputation service and/or to a policy server.

The processor circuitry 26 may receive the network configuration 42 in any suitable manner (e.g., using services such as DHCP and/or DNS). In one embodiment, the network configuration 42 may be obtained from the main operating system 34. For example, the processor circuitry 26 may run an agent 74 on the loaded operating system 34, such that the agent 74 obtains the network configuration 42 from the operating system 34. This agent 74 can automatically retrieve necessary network settings and credentials, simplifying the configuration process and ensuring that the device is correctly set up to communicate with the reputation service 14. In this way, the agent 74 can mirror the main operating system network configuration and make it available to the pre-boot environment. For example, the agent 74 may obtain the configuration from the main operating system by periodically reading the network configuration 42 or by receiving a notification when the network configuration 42 is changed (e.g., through the use an API).

The pre-boot environment could also receive the network configuration directly or through the agent 74 from a centrally managed policy server. That is, the network configuration 42 may alternatively or additionally be received from a policy server. A policy server can provide centralized management and distribution of network settings, ensuring consistency and compliance with organizational policies across multiple devices. The processor circuitry 26 may provide the obtained network configuration to the communication interface 24.

The communication interface 24 may communicate with the reputation service 14 using an application programming interface (API). To reduce the number of communications sent to the reputation service 14, the computer device 12 may batch communications with the reputation service 14. This batching process consolidates multiple communication requests into fewer interactions, reducing network traffic and latency. That is, the processor circuitry 26 may batch indicators 48 before sending them to the reputation service 14, such that a plurality of indicators 48 are sent to the reputation service 14 in a single call (e.g., a single API call). For example, instead of sending each indicator 48 individually, the processor circuitry 26 can aggregate multiple indicators 48 into a single data packet. This approach not only optimizes network usage but also enhances the overall efficiency of the communication process.

In addition to the storage memory 20 and the processing memory 22, the processor circuitry 26 may additionally scan peripheral device(s) 80. This may be used to address threats coming from outside of the internal components of the computer device 12. That is, one or more peripheral devices

80 may be communicatively connected to the computer device 12 and the scanned targeted memory 46 may include the peripheral devices 80. This scanning of peripheral devices may be used to address external vectors for malware, capable of introducing threats from external sources.

For example, the peripheral device may be a USB device including a memory. USB devices are commonly used for data transfer and storage, making them frequent targets for malware infections. The targeted memory 46 may include this memory of the USB device, ensuring that any data stored on or transferred through the USB device is scanned for potential threats.

The computer processor 16 and processor circuitry 26 may have various implementations. For example, the computer processor 16 and processor circuitry 26 may include any suitable device, such as a processor (e.g., CPU, Graphics Processing Unit (GPU), Tensor Processing Unit (TPU), Trusted Platform Module (TPM) hardware, etc.), programmable circuit, integrated circuit, memory and I/O circuits, an application specific integrated circuit, microcontroller, complex programmable logic device, other programmable circuits, or the like. Instructions for performing the method described below may be stored in the non-transitory computer readable medium and executed by the computer processor 16 and processor circuitry 26. The computer processor 16 and processor circuitry 26 may be communicatively coupled to the storage memory, processing memory, and communication interface (also referred to as a network interface) through a system bus, mother board, or using any other suitable structure known in the art.

The storage memory 20, 60 may be, for example, one or more of a buffer, a flash memory, a hard drive, a removable media, a non-volatile memory, or other suitable device. The storage memory 20, 60 is considered a non-transitory computer readable medium. The storage memory 20, 60 may exchange data with the processor circuitry and computer processor, respectively, over a data bus. Accompanying control lines and an address bus between the storage memory 20, 60 and the processor circuitry and computer processor, respectively, may also be present.

The processing memory 22 may be, for example, one or more of a volatile memory, a random-access memory (RAM), or other suitable device. In a typical arrangement, the processing memory 22 functions as system memory for the processor circuitry 26. The processing memory 22 may exchange data with the processor circuitry over a data bus. Accompanying control lines and an address bus between the processing memory 22 and the processor circuitry also may be present.

The computer device 12 and reputation service 14 may each be embodied as any suitable computer device. These computer devices may encompass a wide range of computing devices suitable for performing the disclosed functions and methods. This includes but is not limited to servers, desktop computers, network switches, routers, laptops, mobile devices, tablets, and any other computerized device capable of executing software instructions. The computer devices may include standard components such as a processor, memory, storage, input/output interfaces, and other necessary elements to execute the methods effectively. Furthermore, the computer device is not limited to a single device but may be embodied in a distributed computing environment. In such an environment, multiple interconnected devices may collaborate and work in unison to execute the computational steps of the methods and functions.

The communication interface 24 may comprise a wireless network adaptor, an Ethernet network card, or any suitable device that provides an interface to a network. The communication interface 24 may be communicatively coupled to the computer readable medium, such that the communication interface 24 is able to send data stored on the computer readable medium across the network and store received data on the storage memory 20. The communication interface 24 may also be communicatively coupled to the processor circuitry such that the processor circuitry is able to control operation of the communication interface 24.

Figure 3:
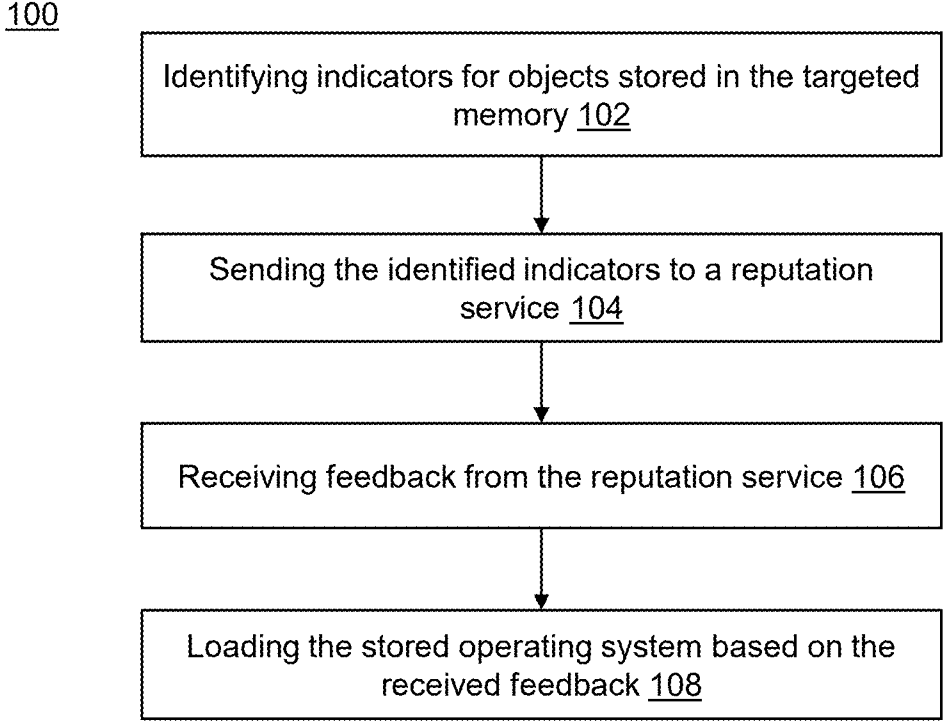
FIG. 3 is an exemplary flow diagram of a method performed by a computer device for leveraging a Full Disk Encryption (FDE) pre-boot environment to conduct anti-malware scans during startup.

Turning to FIG. 3, a method 100 performed by a computer device is shown for leveraging a Full Disk Encryption (FDE) pre-boot environment to conduct anti-malware scans during startup. The method 100 involves processor circuitry executing the below described steps.

In steps 102, 104, and 106, before loading with processor circuitry of the computer device an operating system stored in a storage memory of the computer device, the processor circuitry scans a targeted memory of the computer device for malware. In step 102, the processor circuitry identifies indicators for objects stored in the targeted memory. In step 104, the processor circuitry sends the identified indicators to a reputation service via a communication interface of the computer device. In step 106, the processor circuitry receives via the communication interface feedback from the reputation service. In step 108, the processor circuitry loads the stored operating system based on the received feedback.

The method 100 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 100 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to “a,” “an,” and/or “the” may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a “means”) used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device leveraging a Full Disk Encryption (FDE) pre-boot environment to conduct anti-malware scans during startup, the computer device comprising:

a communication interface configured to communicate with a reputation service using a network configuration;

processing memory comprising a temporary non-transitory computer readable medium;

storage memory comprising a non-transitory computer readable medium including:

disk partitions comprising an EFI (Extensible Firmware Interface) system partition (ESP) and at least one other disk partition storing an operating system, wherein the operating system comprises operating system files including a registry; and a cache configured to store previous scans of targeted memory, wherein:

each of the stored previous scans includes at least one previous indicator associated with at least one previous verdict received from the reputation service; and the targeted memory includes at least one of the ESP, at least one of the disk partitions, the registry of the operating system files, or the processing memory; and processor circuitry configured to:

before loading the stored operating system, scan the targeted memory for malware by:

identifying indicators for objects stored in the targeted memory;

for each of the identified indicators:

before sending the identified indicator to the reputation service, search in the cache for a matching identified indicator;

when the matching identified indicator is not found in the cache:

sending the identified indicator to the reputation service via the communication interface; and receiving via the communication interface feedback from the reputation service, wherein:

the feedback includes a verdict;

the verdict is associated with the identified indicator;

the identified indicator is associated with the stored object, such that the verdict is associated with at least one of the stored objects;

the verdict identifies the associated at least one of the stored objects as malicious, suspicious, or benign; and when the matching indicator is found in the cache, apply to the identified indicator the verdict associated with the matching identified indicator; and load the stored operating system based on the received feedback.

2. The computer device of claim 1, wherein the loading of the stored operating system based on the received feedback includes quarantining any of the at least one stored object identified as malicious.

3. The computer device of claim 1, wherein the indicators include at least one of a file hashes, file names, directory names, registry keys, or registry values stored in the targeted memory.

4. The computer device of claim 1, wherein the network configuration includes at least one of network credentials, a list of one or more trusted certificate authorities (CAs), or connection information for a virtual local area network (VLAN) having access to limited external services including the reputation service.

5. The computer device of claim 1, wherein the processor circuitry is further configured to:

run an agent on the loaded operating system, such that the agent obtains the network configuration from the operating system; and provide the obtained network configuration to the communication interface.

6. The computer device of claim 1, wherein the communication interface is configured to receive the network configuration from a policy server.

7. The computer device of claim 1, wherein:

the communication interface communicates with the reputation service using an application programming interface (API); and the processor circuitry is further configured to batch indicators before sending to the reputation service, such that a plurality of indicators are sent to the reputation service in a single call to the API.

8. The computer device of claim 1, wherein the processor circuitry is further configured to limit scanning to a limited set of objects stored in the storage memory and processing memory, such that the scanning of the targeted memory has a limited time duration.

9. The computer device of claim 1, wherein one or more peripheral devices are communicatively connected to the computer device and the scanned targeted memory includes the peripheral devices.

10. The computer device of claim 1, wherein the reputation service comprises at least one of a local database, a remote database, or a remote service.

11. A method performed by a computer device for leveraging a Full Disk Encryption (FDE) pre-boot environment to conduct anti-malware scans during startup, the method comprising:

before loading with processor circuitry of the computer device an operating system stored in a storage memory of the computer device, scanning for malware with the processor circuitry a targeted memory of the computer device by:

identifying indicators for objects stored in the targeted memory;

for each of the identified indicators:

before sending the identified indicator to a reputation service, searching in a cache for a matching identified indicator;

when the matching identified indicator is not found in the cache:

sending the identified indicator to the reputation service via a communication interface of the computer device;

receiving via the communication interface feedback from the reputation service, wherein:

the feedback includes a verdict;

the verdict is associated with the identified indicator;

the identified indicator is associated with the stored object, such that the verdict is associated with at least one of the stored objects;

the verdict identifies the associated at least one of the stored objects as malicious, suspicious, or benign; and the storage memory is a non-transitory computer readable medium including:

disk partitions comprising an EFI (Extensible Firmware Interface) system partition (ESP) and at least one other disk partition storing an operating system; and the cache configured to store previous scans of the targeted memory, wherein:

each of the stored previous scans includes at least one previous indicator associated with at least one previous verdict received from the reputation service;

each of the at least one previous verdict identifies the associated at least one previous indicator as malicious, suspicious, or benign;

the operating system comprises operating system files including a registry;

processing memory comprising a temporary non-transitory computer readable medium;

the targeted memory includes at least one of the ESP, the at least one disk partition, the registry of the operating system files, or the processing memory; and when the matching indicator is found in the cache, applying the at least one verdict associated with the matching identified indicator to the identified indicator; and loading with the processor circuitry the stored operating system based on the received feedback.

12. The method of claim 11, wherein the loading of the stored operating system based on the received feedback includes quarantining any of the at least one stored object identified as malicious.

13. The method of claim 11, wherein the indicators include at least one of a file hashes, file names, directory names, registry keys, or registry values stored in the targeted memory.

14. The method of claim 11, wherein the network configuration includes at least one of network credentials, a list of one or more trusted certificate authorities (CAs), or connection information for a virtual local area network (VLAN) having access to limited external services including the reputation service.

15. The method of claim 11, further comprising:

running with the processor circuitry an agent on the loaded operating system, such that the agent obtains the network configuration from the operating system; and the processor circuitry providing the obtained network configuration to the communication interface.

16. A system for leveraging a Full Disk Encryption (FDE) pre-boot environment to conduct anti-malware scans during startup, the system comprising:

a reputation service comprising computer hardware including a computer processor;

a computer device comprising:

a communication interface configured to communicate with the reputation service using a network configuration;

processing memory comprising a temporary non-transitory computer readable medium;

storage memory comprising a non-transitory computer readable medium including:

disk partitions comprising an EFI (Extensible Firmware Interface) system partition (ESP) and at least one other disk partition storing an operating system, wherein the operating system comprises operating system files including a registry; and a cache configured to store previous scans of targeted memory, wherein:

each of the stored previous scans includes at least one previous indicator associated with at least one previous verdict received from the reputation service; and the targeted memory includes at least one of the ESP, at least one of the disk partitions, the registry of the operating system files, or the processing memory; and processor circuitry configured to:

before loading the stored operating system, scan the targeted memory for malware by:

identifying indicators for objects stored in the targeted memory; and for each of the identified indicators:

before sending the identified indicator to the reputation service, search in the cache for a matching identified indicator;

when the matching identified indicator is not found in the cache:

sending the identified indicator to the reputation service via the communication interface;

when the matching indicator is found in the cache, apply to the identified indicator the verdict associated with the matching identified indicator;

wherein the computer processor of the reputation service is configured to:

receive the sent indicators;

analyze the received indicators to determine feedback, wherein:

the feedback includes at least one verdict;

the at least one verdict is associated with at least one indicator of the sent indicators;

each of the indicators is associated with at least one of the stored objects, such that the at least one verdict is associated with at least one of the stored objects; and the at least one verdict identifies the associated at least one of the stored objects as malicious, suspicious, or benign; and send the determined feedback to the computer device;

wherein the processor circuitry of the computer device is further configured to:

receive via the communication interface the sent feedback; and load the stored operating system based on the received feedback.

17. The system of claim 16, wherein:

the reputation service includes memory storage comprising a non-transitory computer readable medium and storing a database associating known indicators with known verdicts, such that each of the stored known indicators is associated with a known verdict;

the analyzing of the received indicators to determine feedback comprises:

comparing each of the received indicators to the database; and applying the associated known verdict to a received indicator when the received indicator matches one of the stored known indicators.

18. The system of claim 16, wherein:

the reputation service includes memory storage comprising a non-transitory computer readable medium and storing a machine learning algorithm trained to generate a verdict based on an input indicator; and the analyzing of the received indicators to determine feedback comprises:

applying the machine learning algorithm to each of the received indicators, such that the machine learning algorithm outputs the generated verdict for each of the received indicators; and applying the generated verdict to each of the received indicators.

* * * * *